No. 671,142. Patented Apr. 2, 1901.
J. Z. MURPHY.
VALVE.
(Application filed July 5, 1900.)
(No Model.) 2 Sheets—Sheet 1.

Witnesses:
Inventor:
John Z. Murphy,
Att'ys

THE NORRIS PETERS CO., PHOTO-LITHO., WASHINGTON, D. C.

No. 671,142. Patented Apr. 2, 1901.
J. Z. MURPHY.
VALVE.
(Application filed July 5, 1900.)
(No Model.) 2 Sheets—Sheet 2.

Witnesses:
Inventor:
John Z. Murphy,

UNITED STATES PATENT OFFICE.

JOHN Z. MURPHY, OF CHICAGO, ILLINOIS.

VALVE.

SPECIFICATION forming part of Letters Patent No. 671,142, dated April 2, 1901.

Application filed July 5, 1900. Serial No. 22,530. (No model.)

*To all whom it may concern:*

Be it known that I, JOHN Z. MURPHY, a citizen of the United States, residing at Chicago, in the county of Cook and State of Illinois, have invented a new and useful Improvement in Valves, of which the following is a specification.

My invention relates particularly to the operation of large valves, and my primary object is to provide a valve of improved construction which may be readily operated.

Figure 1:
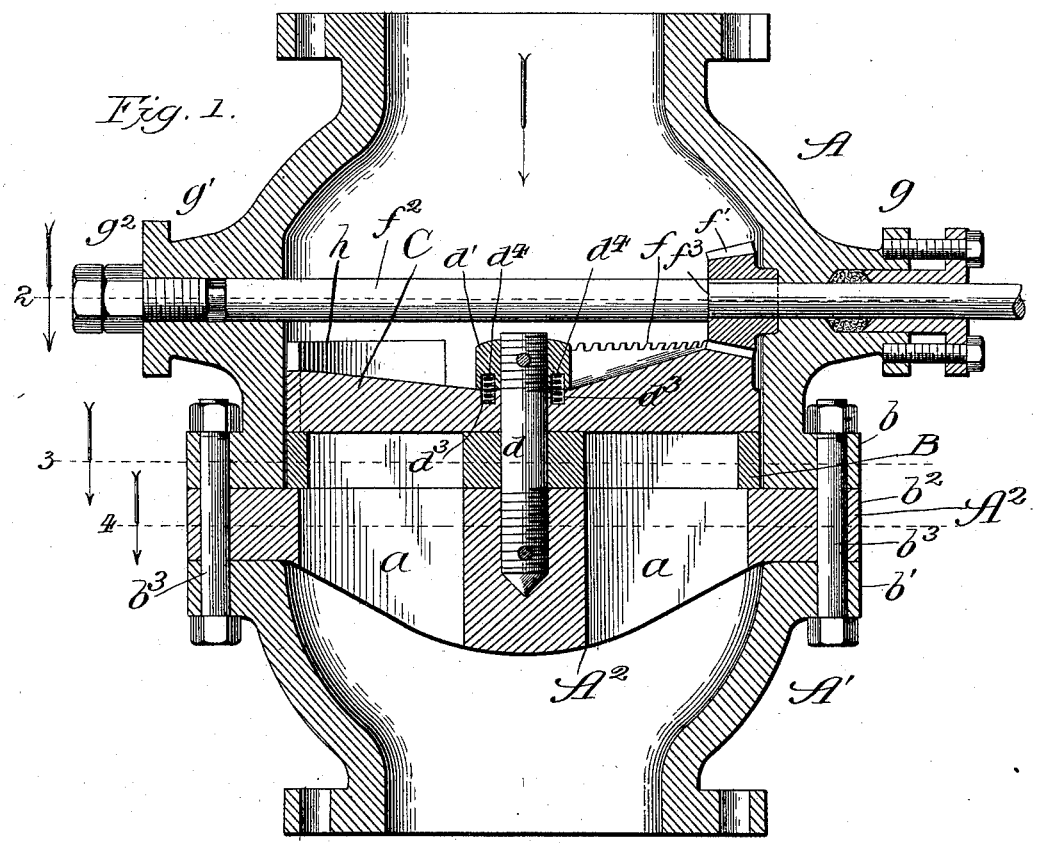
Figure 2:
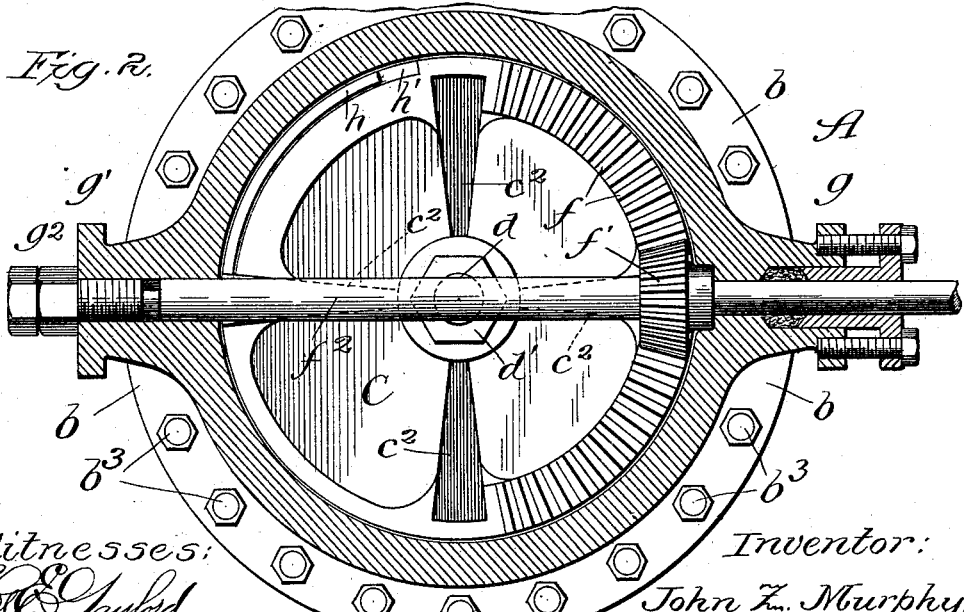
Figure 3:
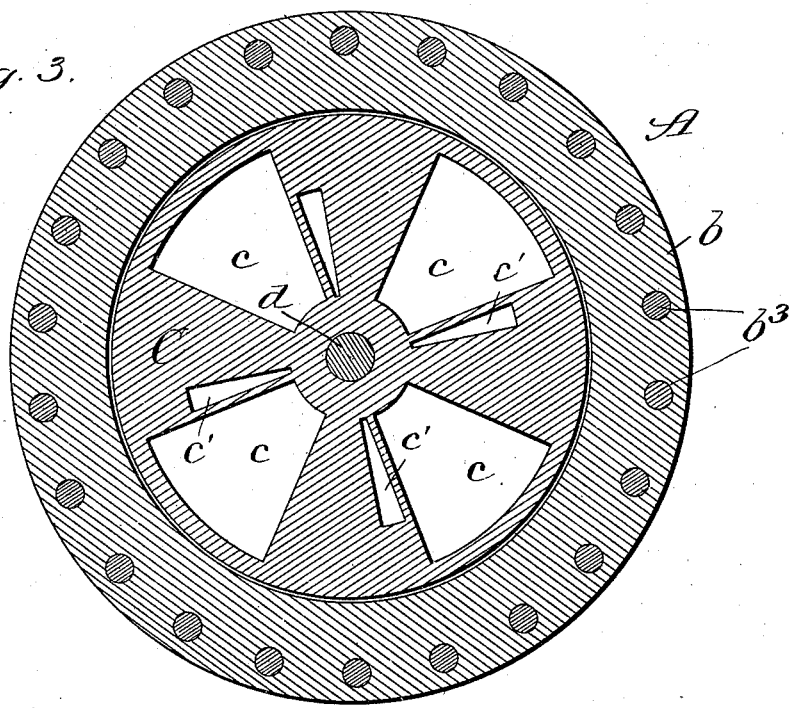
Figure 4:
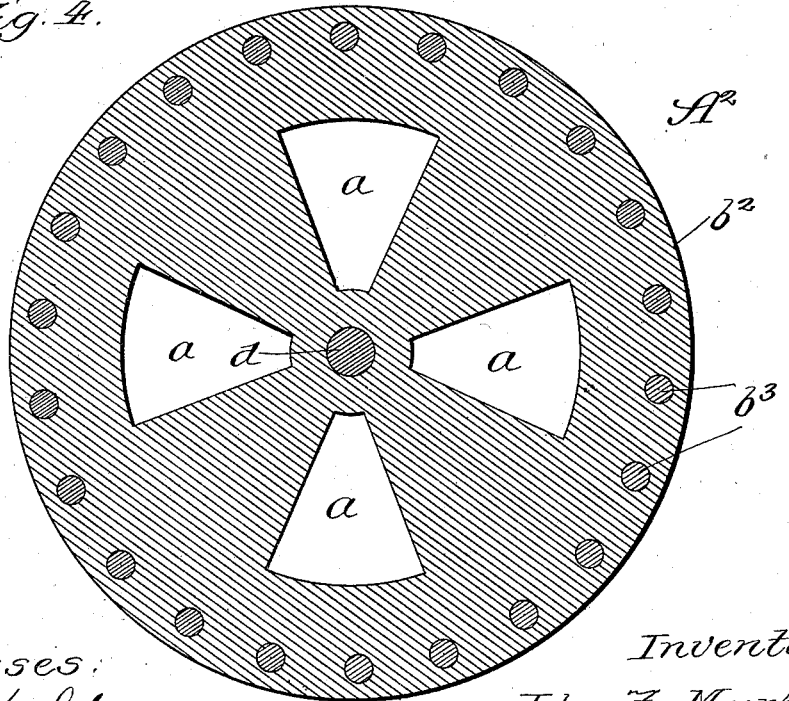

In the accompanying drawings, Figure 1 is a sectional view of my improved valve-casing and attached parts, and Figs. 2, 3, and 4 sections taken as indicated at the corresponding lines of Fig. 1.

In the preferred construction the valve-casing and valve-seat comprise the globe-sections A A' and the interposed section $A^2$, provided with ports $a$. These sections are provided with peripheral flanges $b$ $b'$ $b^2$, whereat they are secured together by bolts $b^3$. There are employed a main admission-valve B and an auxiliary or relief valve C, the former being provided with main admission-ports $c$ and relief-ports $c'$ and the latter with arms $c^2$, which cover said relief-ports. The valves are journaled to rotate on a central stud $d$, projecting upwardly from the valve-seat. This stud is fixed to the valve-seat and is provided with a head $d'$, having on its under surface a circular groove $d^2$, which registers with a corresponding groove $d^3$ in the adjacent surface of the valve C, the two grooves receiving springs $d^4$.

The valve C is provided throughout a portion of the periphery of its upper or outer surface with a rack or gear-segment $f$, with which engages a pinion $f'$, fixed on a shaft $f^2$, disposed parallel to the valves and journaled in the section A of the casing. Preferably the section A is provided with a stuffing-box $g$ and a perforated boss $g'$, and the shaft is reduced in size at one end to receive the pinion, whereby a shoulder $f^3$ is afforded, which confines the pinion against a seat or recess on the adjacent inner surface of the section A. An adjustable set-screw $g^2$ has threaded connection with the internal surface of the boss $g'$, and its reduced end bears against the adjacent end of the shaft, whereby the shaft is confined longitudinally. The valve B is provided at a portion of the periphery of its upper surface with a lug $h$, which is movable in a recess or slot $h'$ at the periphery of the relief-valve. The ends of the recess afford shoulders which are engaged in opening or closing the main valve after the supplemental valve has been first opened or closed. It will thus be understood that when the shaft $f^2$ is rotated, as by a suitable hand-wheel or other means, the small area-valve C is first turned to uncover the relief-ports, after which the main valve is opened, and that in the reverse movement the valve C is first closed and then through its medium the main valve is closed. When the relief-valve is opened preparatory to opening the main valve, the effect is to equalize the pressure upon or balance the main valve. The springs $d^4$ serve to yieldingly hold the valves to their seats after the steam-pressure has become equalized.

It will be observed that my construction is such that the top of the valve-casing section A is left unobstructed, whereby this section, as well as the section A', can be provided with a pipe-attaching flange and the steam caused to pass in a straight course through the valve.

As shown, the valve-casing is contracted at its ingress and egress ends, and the pinion $f'$ is removed from the course of the steam, being sheltered by the overhanging shoulder of the valve-casing.

What I claim as new, and desire to secure by Letters Patent, is—

1. In a valve, the combination of a casing having an open ingress end, a valve-seat, a main valve provided with main and relief ports and located between said valve-seat and said ingress end, means on the relief-valve for engaging the main valve after an initial rotation of the relief-valve, and means, laterally arranged with reference to the casing and engaging the periphery of said relief-valve, through the medium of which the relief-valve is operated, substantially as and for the purpose set forth.

2. In a valve, the combination of a casing, a valve-seat, a main valve provided with main and relief ports, a relief-valve covering said relief-ports, a rack on the periphery of the relief-valve, a pinion engaging said rack, means for operating said pinion, and means for engagement on said valves, whereby the main valve may be operated through the medium of the relief-valve after an initial movement of the relief-valve, substantially as described.

3. The combination of a valve-casing having end openings in a direct line with each other and provided with pipe-attaching end flanges, a circular valve-seat intermediate said ends and provided with ports, a circular main valve provided with main and relief ports, a relief-valve covering the relief-ports, means on said valves for engaging each other after a partial rotation of the relief-valve and through the medium of which the main valve is operated, and means, laterally arranged with reference to the casing, and engaging the periphery of said relief-valve, and through the medium of which said relief-valve is operated, substantially as and for the purpose set forth.

4. The combination of a valve-casing, a valve-seat $A^2$ intermediate the ends thereof, a main valve, a relief-valve, a central stud connecting said valves to said valve-seat, a rack $f$ on the relief-valve, a transverse shaft $f^2$, a pinion on said shaft and in engagement with said rack, and a lug and recess on said valves, whereby the main valve is operated through the medium of the relief-valve, substantially as described.

5. The combination of valve-casing sections A and A', an interposed section $A^2$ provided with ports and affording a valve-seat, a central stud secured to said valve-seat, a main valve and a relief-valve journaled on said stud, a head for said stud, a spring confined between said head and said relief-valve, means on the relief-valve for engaging and operating the main valve, and means for operating the relief-valve, substantially as described.

6. The combination of a valve-casing having contracted ingress and egress ends in direct line with each other, a transverse valve-seat interposed between the ends, a main valve provided with main and relief ports, a relief-valve covering the relief-ports, means on the relief-valve for engaging and moving the main valve, a rack on the periphery of said relief-valve, a transverse actuating-shaft, and a pinion on said shaft and engaging said rack, said pinion being located beneath the contracted portion of the adjacent end of the casing and out of the course of the fluid, substantially as and for the purpose set forth.

7. The combination of a valve-casing having contracted ingress and egress ends in direct line with each other, a transverse valve-seat interposed between the ends, a main valve provided with main and relief ports, a relief-valve covering the relief-ports, means on the relief-valve for engaging and moving the main valve, operating means at the periphery of said relief-valve, and manually-actuated means engaging said peripheral operating means and located beneath the contracted portion of the adjacent end of the casing out of the course of the fluid, substantially as and for the purpose set forth.

JOHN Z. MURPHY.

In presence of—
  D. W. LEE,
  A. D. BACCI.